United States Patent [19]
Kern et al.

[11] Patent Number: 5,551,604
[45] Date of Patent: Sep. 3, 1996

[54] MODULAR STICKY FOOD DISPENSER

[76] Inventors: Francois Kern, 97 Dorset Road, Scarborough, Ontario, Canada, M1M 2S9; Derek Burgener, 40 Marcella Street, Scarborough, Ontario, Canada, M1G 1L2

[21] Appl. No.: 374,820

[22] Filed: Jan. 19, 1995

[51] Int. Cl.⁶ ................................................ G01F 11/10
[52] U.S. Cl. ............................... 222/349; 222/368
[58] Field of Search ................................ 222/345, 349, 222/367, 368

[56] References Cited

U.S. PATENT DOCUMENTS

| | | | |
|---|---|---|---|
| 2,906,438 | 9/1959 | Carpenter | 222/368 |
| 3,231,105 | 1/1966 | Easley, Jr. | 222/368 |
| 4,072,253 | 2/1978 | Walters, Jr. | 222/368 |
| 4,537,333 | 8/1985 | Bjerregaard | 222/368 |
| 4,964,535 | 9/1990 | Curwen | 222/368 |

*Primary Examiner*—Andres Kashnikow
*Assistant Examiner*—Philippe Derakshani

*Attorney, Agent, or Firm*—Eugene J. A. Gierczak

[57] ABSTRACT

A relatively hygienic dispenser is provided for dispensing particulate matter such as bulk foods, gum drops or even hardware such as nuts and bolts. A dispenser mechanism is attached to a storage bin or receptacle. The material, typically food or sticky candy, falls toward dispenser module due to gravity. The dispenser has a four sided roughly rectangular, variable geometry passageway. Two opposed sides of the passageway are rigid, and the other two opposed sides are flexible. A scoop is pivotally mounted to the two rigid walls and extends across the passageway between them. The two lobed scoop accepts material from the receptacle, is turned either clockwise or counter-clockwise, and discharges material, presumably to a waiting container. The scoop turns between, and in contact with, the two spring-loaded sides, or skirts, and two flexible scraper walls. The scrapers discourage materials from sticking to the outside of the scoop, and the flexible skirts press close to the sides of the scoop as it is turned, limiting flow, yet may flex to discourage crushing or shearing of gummy particles. This permits control of the rate of flow of bulk food materials in a relatively hygienic manner.

13 Claims, 9 Drawing Sheets

MODULAR STICKY FOOD DISPENSER

FIELD OF INVENTION

This invention relates to food dispensing machines such as are found in bulk food stores or candy shops. In particular, it relates to an improved sticky food dispenser of simple, modular construction, that is suitable for operation with a wide variety of sticky foods, that may be easily adjusted and that is easily disassembled for cleaning. The dispenser is also suitable for use with hardware such as nuts and low aspect ratio screws or bolts.

BACKGROUND ART

Food dispensing machines have long been known. They range from coin operated devices, such as bubble gum machines, to simple open topped bins such as are commonly found in bulk food stores. There are several long standing problems related to use of food dispensing machines with sticky foods, such as gelatinous candies. The well-known coin operated metal candy dispensers have a tendency to mutilate gelatinous candies, and also to be prone to accretions of sticky, sugary candy material within the metal parts of the mechanism, making them prone to jamming or failure. These metal parts may be difficult to disassemble and clean.

Bulk food bins, commonly seen in stores, are often unhygienic. Commonly a scoop is provided such that customers may remove or lift the lid of the bulk food bin and scoop out such quantity of material as they desire. The handling of food products in this way makes bulk foods a ready ground for the spread of disease. The containers themselves may not be cleaned very frequently.

Known bulk food bins and dispensers may be suitable for dispensing dry goods. It is more difficult to deal with sticky products such as gumdrops or artificially flavoured gelatin shapes. Over time gelatinous candies tend to stick to the dispensers and harden.

Attempts have been made to address one or more of these problems. For example U.S. Pat. No. 4,318,577 shows bins for displaying such things as buns with a sneeze shield and a lower cleaning tray. U.S. Pat. No. 5,105,991 to Johnson shows a relatively hygienic system incorporating a rake with an externally accessible handle. U.S. Pat. No. 4,718,578 to Radek et al., shows another such rake system, as does U.S. Pat. No. 4,592,494 to Ellis et al. U.S. Pat. No. 4,802,609 to Morse et al. shows yet another variation, in which an auger is used to draw material out of a hopper or receptacle.

There remains a need for a simple, bulk food dispenser that is easily cleaned, that is not easily prone to contamination, has flexible geometry to avoid or reduce damage to the particulate material being dispensed, and that is suited to dispensing sticky materials.

DISCLOSURE OF INVENTION

The invention disclosed herein is a dispenser suitable for use with a number of foods, such as sticky candies, or nuts, or other particulate material including hardware such as nuts, bolts, and screws, that is easily cleaned, may be turned in either clockwise or counter-clockwise directions, and which employs flexible walls suited to reduce or delay the adherence of sticky materials A first aspect of the invention includes a dispenser for co-operation with a source of material to be dispensed, the dispenser including a passageway having an inlet to receive material from that source and an outlet; a scoop for controlling the dispensing of that material, the scoop being movable from a first position for receiving a charge of material through the inlet, to a second position for discharging that charge of material; means for mounting the scoop across, and in substantial obstruction of, the passageway; and the passageway comprising at least one flexible wall biased toward and disposed to co-operate with said scoop, and which may further include the means for mounting the scoop across the passageway being intermediate the inlet and the outlet; the scoop comprising at least one cavity suited for receiving a charge of material via the inlet in the first position of the scoop; the cavity being suited for discharge of the charge of material in the second position of the scoop; and the flexible wall being in continuous contact with at least one of (a) the scoop or (b) a portion of the charge protruding from the scoop; and may yet further either include (i) the scoop being pivotally mounted across the passageway for rotation about an axis of rotation substantially normal thereto; the scoop comprising actuating means, such as a handle, for moving the scoop from the first position to the second position such that the scoop is suited for continuous rotation in only one of (a) a clockwise direction, (b) a counter-clockwise direction, or (c) a reciprocating rocking motion; or, (ii) the passageway comprising at least two spaced apart opposed flexible walls; and the scoop being intermediate those flexible walls; the scoop being pivotally mounted across the passageway for rotation about an axis of rotation substantially normal thereto; the scoop comprising actuating means for moving the scoop from the first position to the second position; and the scoop being suited for rotation in either (a) a clockwise direction or (b) a counter-clockwise direction.

In a second aspect of the invention there is a dispenser suitable for co-operation with a source of material to be dispensed, that source being a supply of material contained within a receptacle, that receptacle having an outlet conduit, the dispenser comprising a modular dispenser carrier for slidable location within the conduit, the carrier comprising a passageway, the passageway having an inlet for receiving material from the source, and the passageway having a periphery; a scoop for controlling the dispensing of the material, the scoop being movable from a first position for receiving a charge of the material to a second position for discharging the charge; means for mounting the scoop across, and in substantial obstruction of, the passageway; and the carrier comprising at least one flexible wall biased toward and disposed to co-operate with the scoop, the flexible wall defining a portion of the periphery of said passageway; and may further include the carrier comprising at least one substantially rigid wall forming the balance of the periphery; the scoop being mounted to the at least one substantially rigid wall for rotation about an axis; the carrier comprising two flexible walls each defining a portion of the periphery of said passageway, and each biased toward the scoop; the scoop being intermediate the flexible walls; and the at least one substantially rigid wall defining the balance of the periphery of the passageway.

In another aspect of the invention, which may include the previously described aspects, the dispenser comprises a scoop which itself comprises at least one external longitudinal face, and the dispenser comprises at least one scraper mounted within said passageway for scraping the longitudinal face, or faces, such as may be; and which aspect may be configured such that each of the at least one flexible walls comprises an inward skirt biased toward the scoop, the skin having a captured end and a distal end; and the scraper being mounted to the skin for scraping the scoop; and may further include the scraper being mounted to the skirt adjacent the captured end; and may yet further still incorporate the flexible wall comprising a subordinate seal member; the skin being disposed for substantially tangential contact of the scoop, and the scraper being disposed for intermittent scraping contact of said scoop.

In a fourth aspect of the invention one finds a dispensing system comprising a receptacle having an outlet and a dispenser module disposed to receive material from the receptacle via said outlet; the receptacle having a first mounting means for mounting the dispensing module; and the module having a second mounting means for mating with the first mounting means; the module comprising a carrier, and a scoop; the carrier comprising elements defining a passageway having an inlet and an outlet, those elements including at least one flexible wall; the scoop being supported by said carrier across said passageway; the scoop movable from a first position for receiving a charge of material from the receptacle via the inlet, to a second position for discharging the charge; and in which the first mounting means may be slide means; and the second mounting means may be runner means for engagement of those slide means.

Trials of the present invention have been conducted with the following materials:

i) CANDIES: Bear-shaped gummy candies; Chocolates in the shape of tortoises; Elongated wine-flavoured gum drops; Bubble gum; Hard Shelled multi-coloured chocolate filled candies; Chocolate covered almonds; Jelly beans; Popcorn kernels; Small candy bars; Truncated, fluted conic section peanut butter and chocolate discs ii) SPICES: Peppercorns; Coffee Beans; Rock Salt; Garlic Cloves; Cloves; Chives; Oregano; Chocolate Chips iii) FRUITS AND VEGETABLES: Grapes; Cherries; Olives; Radishes; Dates; Dried Apricots; Whole Walnuts; Peanuts iv) STAPLES: Flour; Pasta Noodles; Bread Crumbs; Rice; Corn Meal; Oats v) CRUNCHY SNACKS: Potato Chips; Pretzel, Peanut & Cereal Mix; Popcorn Kernels; Tortilla Chips; Horn-shaped Chips; Cheezies vi) BREAKFAST CEREALS: Toasted Corn Pieces; O-Shaped Cereal; Puffed Rice Cereal

BRIEF DESCRIPTION OF DRAWINGS

FIG. 2 comprising FIGS. 2a and 2b, is a partial view of the lower and rear facing portions of the preferred embodiment of FIG. 1.

FIG. 3 is a series of perspective views of the dispensing mechanism of the preferred embodiment of FIG. 1. Specifically.

DETAILED DESCRIPTION OF THE PREFERRED EMBODIMENT OF THE INVENTION

Figure 1:
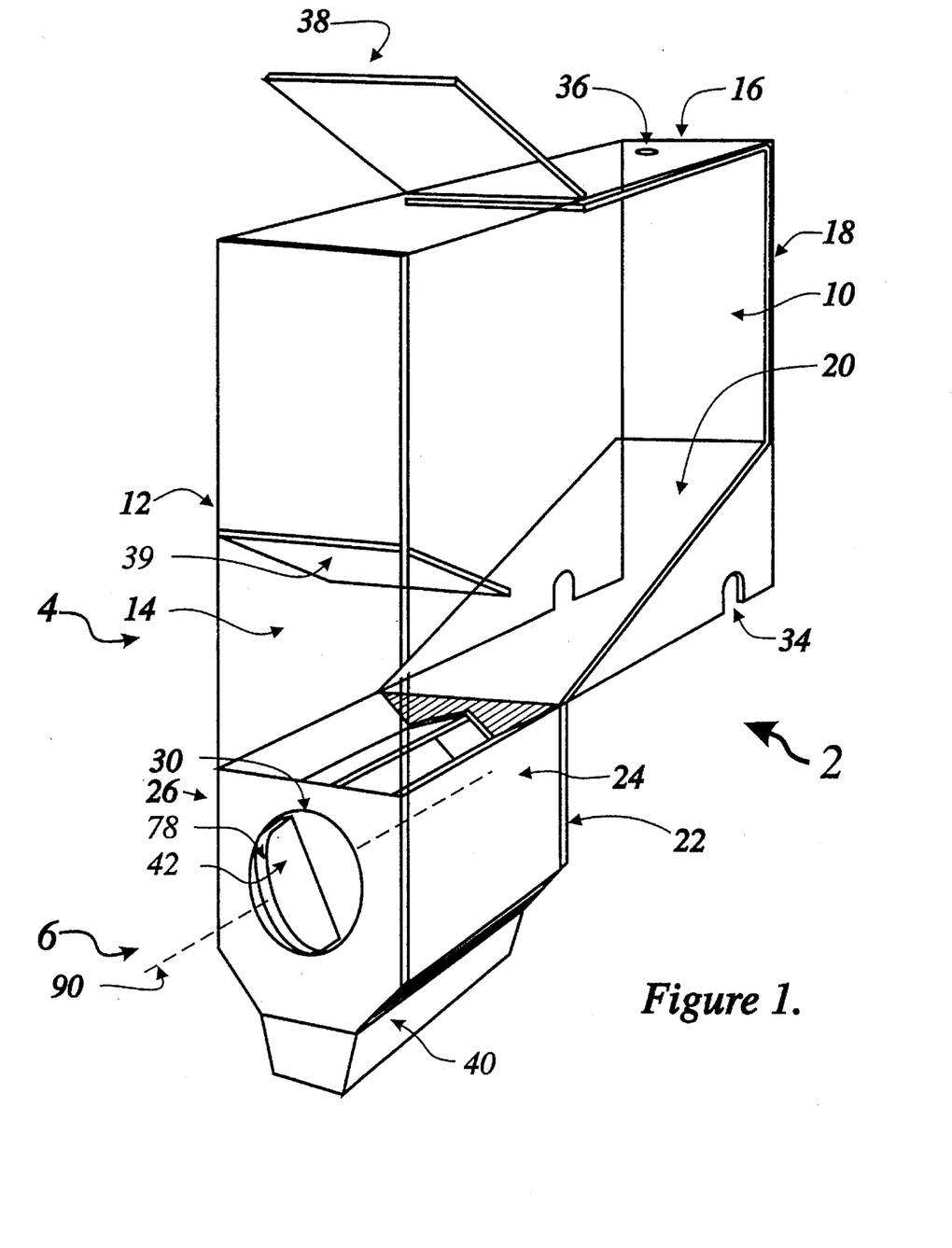
FIG. 1 is a perspective general arrangement view of the preferred embodiment of the invention described herein.

Commencing with FIG. 1, a modular sticky food dispenser is shown generally as 2. It comprises a bulk food bin, or receptacle 4, and a modular dispensing assembly 6.

The receptacle 4 comprises a first wall 10, a second wall 12 of similar profile in parallel spaced relation thereto, a front wall 14, a top wall 16, a rear wall 18, a lower bulkhead 20, and a rear frame 22. The first and second walls 10 and 12 form the sides of receptacle 4 and the front wall, top wall, rear wall, lower bulkhead and rear frame abut each other, and abut first and second walls 10 and 12 to form an enclosure.

First and second walls 10 and 12 each have a lower portion 24 and 26 respectively. Bulkhead 20 is disposed as a perpendicular web between the first and second walls at some downward sloping angle from the rear toward the front. The receptacle is intended to contain a source or supply of material to be dispensed, and the slope of bulkhead 20 is chosen to encourage that material to flow toward the dispensing assembly 6. Frame 22 is disposed parallel to front wall 14, perpendicular to first and second walls 10 and 12, and adjoining the lower, forward end of bulkhead 20.

The lower edges of front wall 14, first and second walls 10 and 12, and frame 22 define an opening shown generally as 28. Similarly, lower portions 24 and 26, and the lower region of front wall 14 co-operate with frame 22 to form a rectangular conduit 29, or exit, from the receptacle 4 generally.

Front wall 14 is provided in a lower region thereof with a circular aperture 30 suitable for the purposes described herein below. Substantially centrally located in frame 22 is a circular aperture 32 of smaller diameter than, coaxial with, and in a parallel plane to aperture 30. Front wall 14, top wall 16, rear wall 18, bulkhead 20, and frame 22 may be formed from a continuous strip of material. In the preferred embodiment all of these walls are made from opaque or clear plastic, although other materials could be used including, but not limited to, glass, wood, fibreboard, or stainless steel depending on the nature of the material to be dispensed.

Receptacle 4 may also comprise such optional features as locating notches 34 in first and second walls 10 and 12, an air hole 36, one or more access panels 38, and a tierward sloped baffle 39. Notches 34 may cooperate with a mounting rack (not shown) for display in, for example, a store. Optional air hole 36 may be used to allow air to enter or escape from receptacle 4 in circumstances where the material to be dispensed is contained within a collapsible bladder, or where material is dispensed that would not easily flow if inflow of air were not permitted to equalise pressure within the receptacle. Optional air hole 36 may be provided with a plug or check valve (not shown). Optional access panels 38 may be provided where it is desired to replenish receptacle 4 from above such that fresher material will be dispensed preferably after earlier material has been exhausted. In some instances it is desirable not to have any such access panels.

For example, the necessity of removing dispenser assembly 6 to replenish receptacle 4 may significantly encourage more frequent cleaning of both dispenser assembly 6 and receptacle 4, and would provide a more sanitary sealed, pilfer-proof enclosure in operation. Forward sloped baffle 39 may be used where the material to be dispensed has a tendency to compact itself under its own weight into dispenser assembly 6. As with bulkhead 20 the slope of baffle 39 is chosen to encourage flow of material to dispenser assembly 6.

Figure 3A:
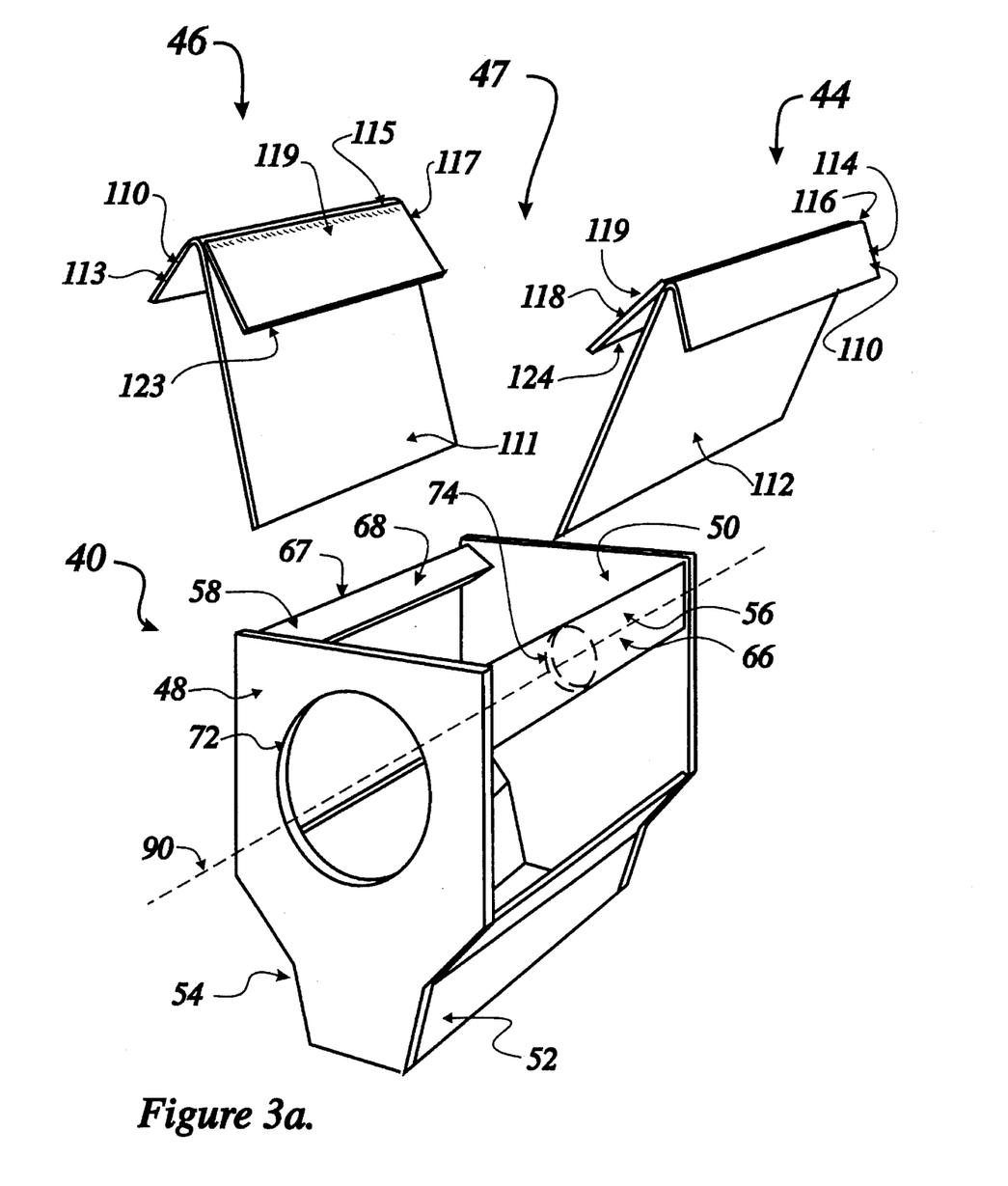
FIG. 3a illustrates the preferred embodiment of FIG. 1.
Figure 3B:
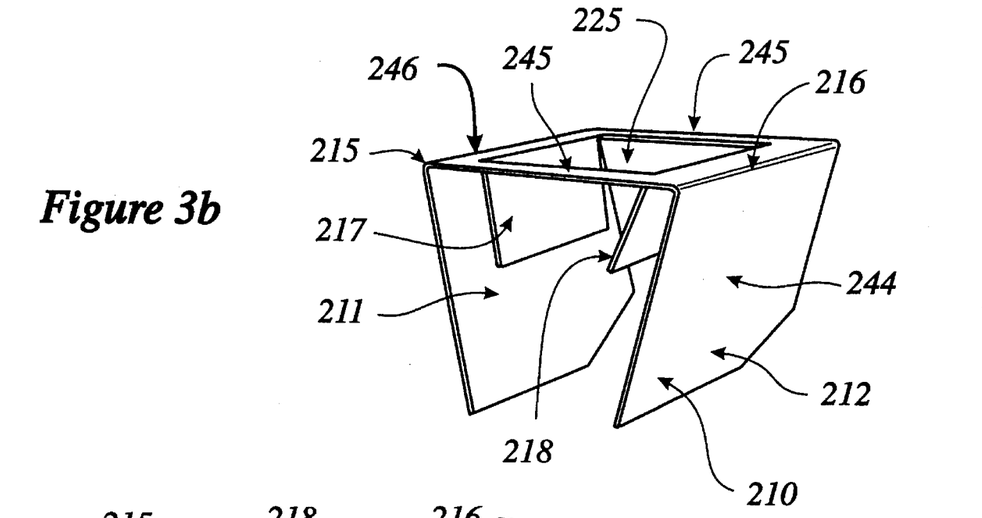
FIGS. 3b and 3c illustrate alternate embodiments of dispenser mechanism components.
Figure 3C:
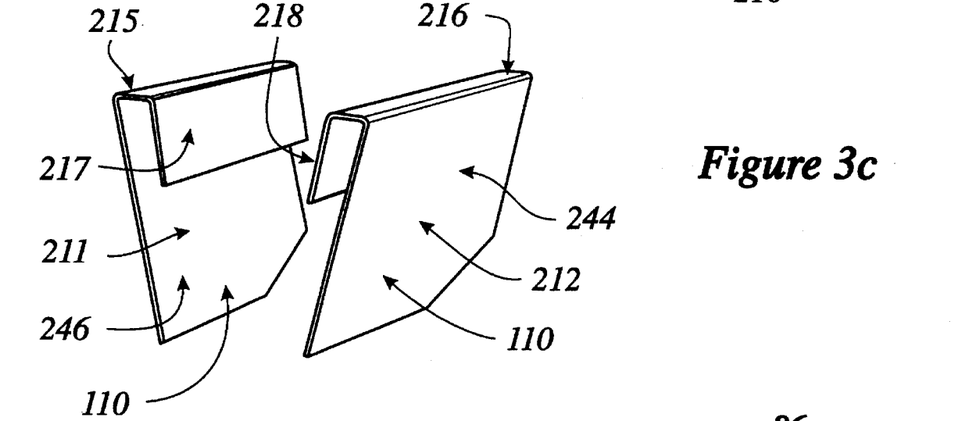
Figure 4:
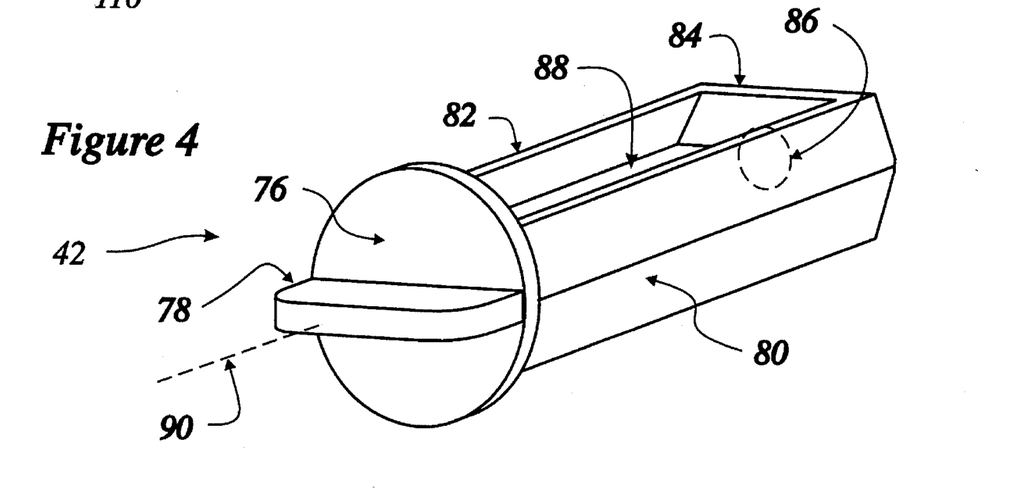
FIG. 4 is a perspective view of a scoop of the mechanism of FIG. 3.

Dispensing Assembly 6 comprises a carrier shown in FIG. 3, and indicated generally as 40, and a scoop shown in FIGS. 4 and 5, and indicated generally as 42. The carrier itself comprises two removable wing members, designated as first and second flappers 44 and 46 respectively. Each of these flappers constitutes a displaceable wall. Also shown is a passageway generally indicated as 47, such as will be described and explained below.

Carrier 40 comprises a front frame 48, a rear frame 50, a first dispenser chute sidewall 52, an opposite second dispenser chute sidewall 54, a first beam 56, and a second beam 58. Each chute sidewall has a dog-leg from, having a foreleg 60, an inwardly oriented knee 62, and a thigh 64. Each beam has the form of a prism having a triangular cross section, although other forms could be used. The prism form has a substantially vertical outer face 66, an upper vertex 67 of a chosen profile, and an inclined inner face 68.

Front frame 48 and rear frame 50 are disposed in spaced apart parallel relationship such that their overall outside dimension is suitable for a snug sliding fit between the rearward face of front wall 14 and the forward face of rear frame 22. The width of front frame 48 and rear frame 50 is chosen for snug sliding accommodation between first and second walls 10 and 12. Chute sidewalls 52 and 54 are disposed adjoining and perpendicular to front frame 48 and rear frame 50, and in spaced apart opposition to each other. The lower edges of front frame 48, rear frame 50, and two opposed forelegs 60 define a dispenser discharge opening 70. Front frame 48 is provided with a generally centrally located aperture 72 corresponding to aperture 30. Similarly, rear frame 50 has a generally centrally located aperture 74 corresponding to circular aperture 32. Both aperture 72 and 74 are suitably adapted for mating engagement of elements of scoop 42 as will be described.

Scoop 42 is illustrated in FIG. 4. It comprises a circular front plate 76, a handle 78 attached thereto, two longitudinal members designated as a first stringer 80, a second stringer 82, a backplate 84, a stub shaft 86, and a partition 88. Front plate 76 is suited for turning either clockwise or counterclockwise in close tolerance within apertures 30 and 72. The thickness of front plate 76 is roughly equal to the combined thickness of front wall 14 plus front frame 48.

When installed as in FIG. 1, apertures 30, 32, 72, 74, front plate 76, and stub shall 86 all have a common centreline, indicated as 90, which is the axis of rotation of the scoop 42. Stringers 80 and 82 are bent panels of identical cross section, of length suitable to yield a scoop 42 of depth corresponding to the depth of carrier 40, disposed in 180 degree opposition about centreline 90, perpendicular to and adjoining front plate 76 and back plate 84. Each stringer has external longitudinal vertices 91 or 92, 93 or 94, and 95 or 96, and external longitudinal first and second faces 97 or 98, and 99 or 100.

As shown in the series of views of FIG. 5, each of stringers 80 and 82 has a number of inward facing slots 102 and 104 in which a partition 88 may seat. In some circumstances it may be preferable to have only a single pair of slots, especially as a large number of slots may be less easy to clean. When assembled, front plate 76, back plate 84, stringers 80 and 82, and partition 88, will define two cavities indicated generally as 106 and 108. In operation a charge of sticky material will alternately fill the these cavities as handle 78 is turned, thereby rotating scoop 42. Partition 88 is made from a rigid plastic sheet that snaps into the chosen slots 102 and 104. The dimensions of partition 88 may be altered to suit the particular pair of slots chosen, and, if desired an overwidth partition may be chosen to achieve a bowed, or arcuate, profile such as may be desired. The standard substantially flat partition is shown in FIG. 5a. Two spaced apart flat partitions are shown in FIG. 5b. Two inwardly bowed partitions are shown in FIG. 5c. Use of such a pair of partitions may be desired to reduce the volume of cavities 106 and 108. FIG. 5d shows a single partition used such that the scoop only discharges once per each 360° rotation. The bottom of the partition may extend to approximate the outer diameter swept by stringers 80 and 82. Such a partition will also act like a spring, and may flex in loading and unloading. This arcuate profile and flexibility may assist in shedding sticky candies. Note also that cavities 106 and 108 need not be of equal volumes.

Figure 5A:
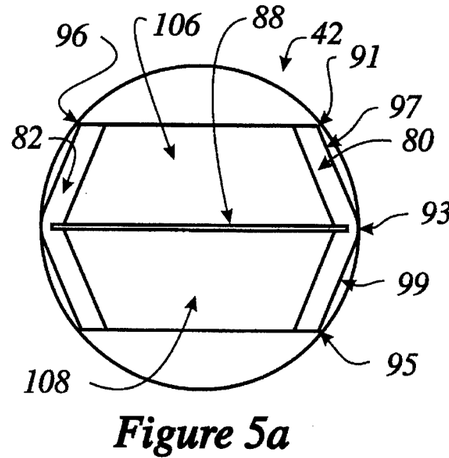
FIG. 5 is a series of five cross sectional views of the dispensing mechanism of FIG. 4, showing five variations 5a–5e.
Figure 5B:
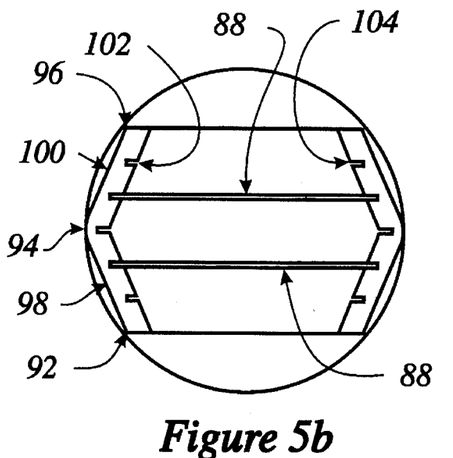
Figure 5C:
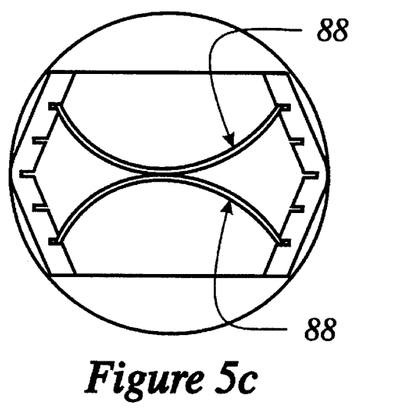
Figure 5D:
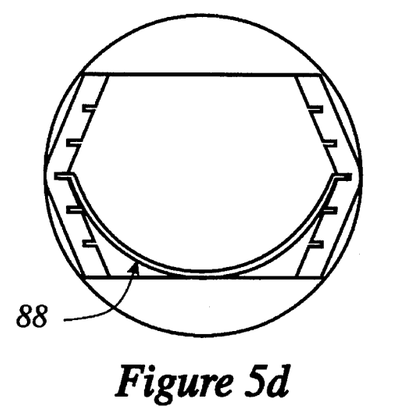
Figure 5E:
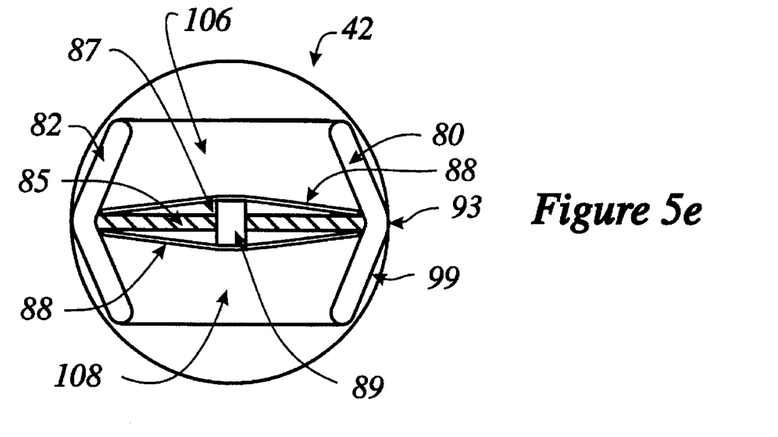

One concern is that a sharp object, such as a stick, could easily be introduced in passageway 47 to puncture partition 88, permitting the material contained in receptacle 4 to flow freely. FIG. 5e shows an alternate embodiment taken at the mid-section of scoop 42 intended to resist vandalism. A solid plate is shown as 85. It extends across the internal width of, and along the internal length of, scoop 42. It is provided with a central aperture 87 through which a close fitting piston 89 is located. In this embodiment two slightly oversized partitions 88 are located to engage opposite ends of piston 89. The piston is sufficiently long that it imposes a spring load in each partition 88. The weight of material pressing against one partition as one cavity is filled causes piston 89 to be displaced. This in turn flexes the opposite partition in the unloaded cavity, encouraging the discharge of material. When neither cavity is loaded the opposing spring loads in the partition cause piston 89 to return to a roughly centred position. Also as shown in FIG. 5e vertices 91, 95, 92 and 96 may be rounded to encourage gentler handling of materials to be dispersed and to lessen wear on flappers 44 and 46.

Flappers 44 and 46 are identical assemblies installed in opposed orientation. Each of flappers 44 and 46 is formed from a first bent stiff plastic blank 110. The width of blank 110 corresponds to the inner dimension of carrier 40, and given its flexibility, may be slightly oversize to give an interference fit when installed between front frame 48 and rear frame 50. After bending the flapper has a dominant, inward depending wing, or dispenser skirt, 111 or 112, a subordinate outward depending wing, or carrier seal 113 or 114, joined by an intermediate bend 115 or 116. A third wing, or scraper 117 or 118, is bonded to the outer face of the skirt 111 or 112 along a bonding line 119 adjacent the bend 115 or 116. A stop, 120, is bonded to the inside face of seal 113 or 114, in a manner suitable for abutting engagement of the lower vertex of the outer vertical face of beam 56 or 58, as the case may be. The scrapper could be mounted independently of the skirt, in a number of ways familiar to those skilled in the art. However, bonding them together to form one part makes installation simple and promotes a beneficial dynamic interaction during operation.

To put dispensing assembly 6 together one commences by laying each of flappers 44 and 46 loosely over one beam 56, or 58 of the carrier 40. Carrier 40 is then introduced into rectangular opening 28, and slides within the previously described conduit 29. Beams 56 and 58 are inset from the edges of front and back frames 76 and 84, by the thickness of the blank 110. Thus, as carrier 40 slides into rectangular conduit 29 carrier seals 113 and 114 are compelled to lie in the space between beams 56 and 58, and lower portions 24 and 26 of walls 10 and 12 respectively. This also causes each stop 120 to locate below beams 56 and 58. The first purpose of stop 120 is to force bend 115 or 116 to locate about the vertex 67 thus "capturing" the upper end of skirt 111 and 112 as the case may be. Vertex 67 may be very sharp, or it may have some chosen bend radius, or other, possibly non-circular, profile. Equally so, bend 115 or 116 may be sharp or curved as desired. The second purpose of these stops is understood when removing carrier 40 from receptacle 4. It is the force imparted by beams 56 and 58 on each stop 120 that pulls flappers 44 and 46 away from the sticky materials.

Carrier 40 is located to align aperture 72 with aperture 30 and aperture 74 with aperture 32. In this position each skirt 112 impinges upon its opposite counterpart, and flappers 46 and 48 are thereby spring loaded. Scoop 42 is inserted through aligned apertures 30 and 72 to locate stub shaft 86 through apertures 32 and 74. In the preferred embodiment the two opposed skirts 111 and 112 must be separated sufficiently to allow scoop 42 to be inserted in a half-turned orientation, i.e., with its narrowest dimension between the skirts. Stub shaft 86 is sized to mate in close dimensional relationship with apertures 32 and 74 and to extend beyond them sufficiently far to permit installation of a locking means, such as the circlip or a cotter pin 122. Many such locking means are known to those skilled in the art. In this position scoop 42 is disposed across and in substantial obstruction of passageway 47. Moreover, scoop 42 is pivotally mounted for rotation about centreline 90.

Even before scoop 42 is installed it can be seen that flappers 44 and 46 work in co-operation with front frame 48 and rear frame 50 to form a variable geometry passageway, earlier indicated as 47. Flappers 44 and 46 constitute two opposed flexible walls, substantially perpendicular to the two substantially parallel rigid walls formed by front frame 48 and rear frame 50. These four cooperating walls define the periphery of passageway 47, each of the flexible walls defining a portion of the periphery, and the substantially rigid walls forming the balance of the periphery.

Insertion of scoop 42 locks carrier 40 in place. It also increases the spring pre-load in flappers 44 and 46. The reaction to this preload is felt in each carrier seal 113 or 114 which is then pressed firmly against wall 10 or 12 as the case may be. Scrapers 117 and 118 each have as distal end, 123 or 124 respectively, remote from bonding line 119. Application of the spring pre-load separates these distal ends 123 and 124 from skirts 111 and 112.

Figure 7A:
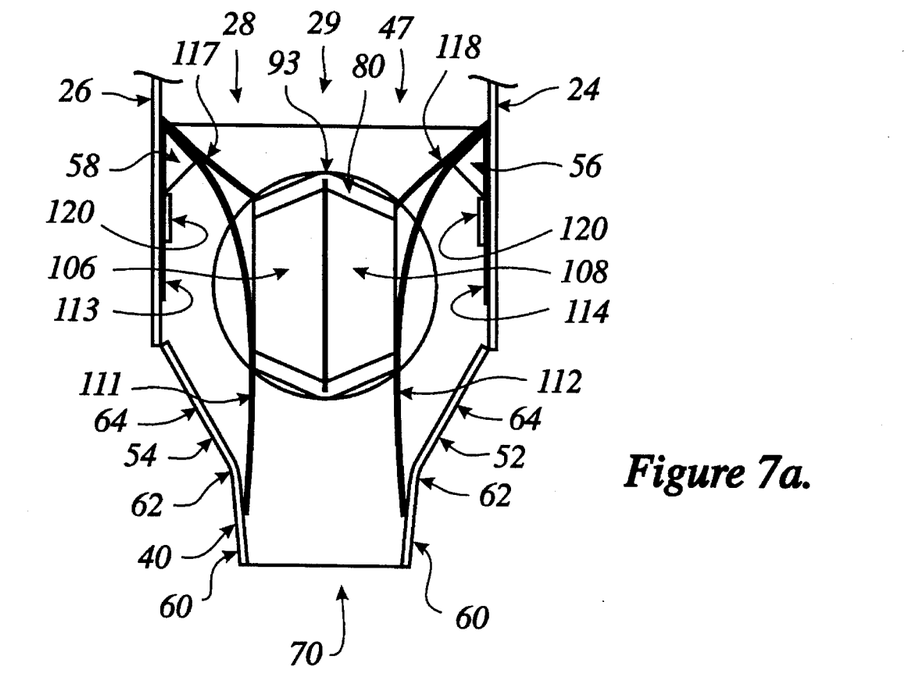
FIG. 7 comprises a series of sectional views 7a–7g depicting successive stages of rotation of the dispensing mechanism of FIG. 3.

Since dispenser assembly 6 is symmetrical about its vertical fore-and-aft centreline it does not matter whether scoop 42 is turned clockwise or counter clockwise, the same sequence of events will occur. For the purposes of explanation, assume a clockwise direction of rotation as viewed from the front face of the dispenser. Initially as shown in FIG. 7a handle 78 is seen in a vertical orientation. Vertex 93 of stringer 80 is vertically uppermost, and vertex 94 of stringer 82 is vertically lowermost.

Distal end 124 of scraper 118 is suspended in the path to be swept out by stringer 80. Distal end 123 of scraper 117 is in contact with, and deflected upwardly by, vertex 91. Vertex 92 is in contact with spring loaded skirt 112 and vertex 96 is in contact with skirt 111. The distal, pending end of skirt 112 extends to impinge upon foreleg 60 of dispenser chute sidewall 52. Similarly skirt 111 impinges on sidewall 54.

Figure 7B:
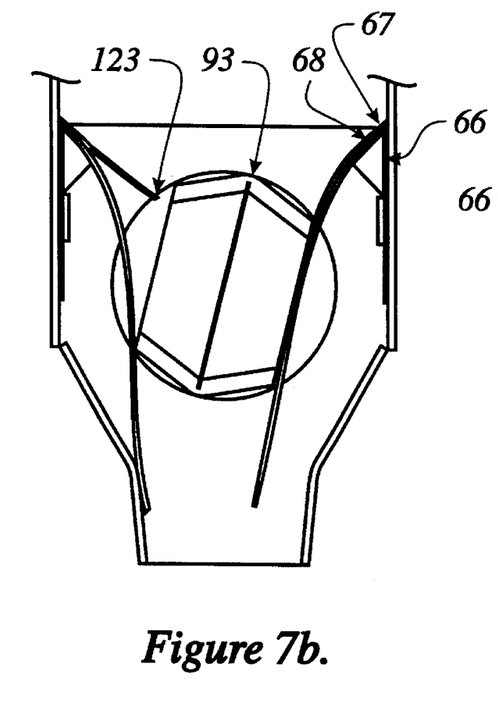

As shown in FIG. 7b, as scoop 42 turns clockwise stringer 80 contacts scraper 124 and deflects it to contact skirt 112. Rotation of vertex 92 permits skirt 112 to lift off sidewall 52, while still in contact with vertex 92.

Figure 7C:
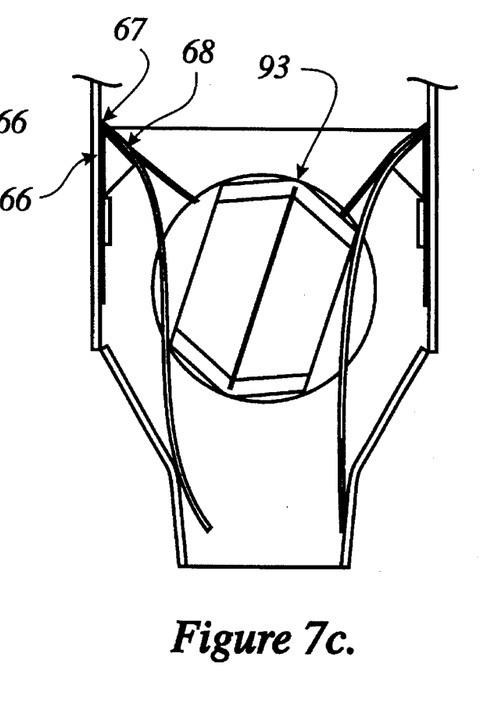

As shown in FIG. 7c, further rotation of scoop 42 releases scraper 124, and it snaps along the face 99 of stringer 80, scraping the face as it does so. Vertex 95 begins to push skirt 112 outward, and again skirt 112 moves to lie along foreleg 60 of sidewall 52. Vertex 92 rotates away from skin 112 and thus cavity 108 begins to open to discharge opening 70. At the same time vertex 96 continues to travel in constant contact upward along skirt 111, shifting the locus of contact of skirt 111 to the knee 62 of chute sidewall 54. As vertex 91 rotates away from scraper 123 cavity 106 begins to admit matter from receptacle 4.

Figure 7D:
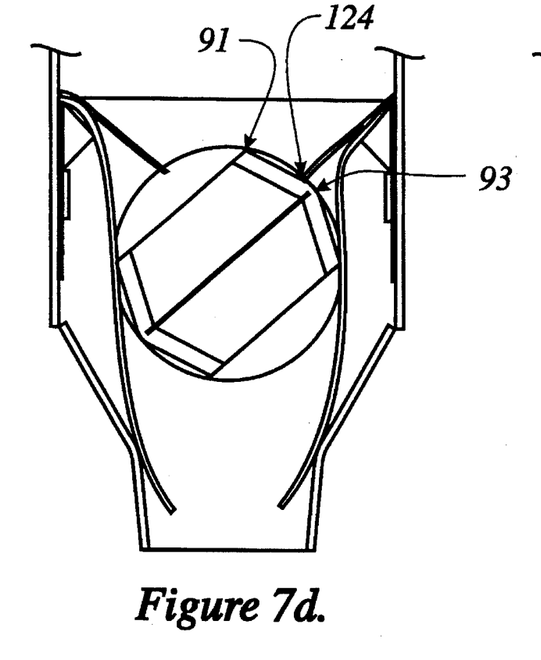
Figure 7E:
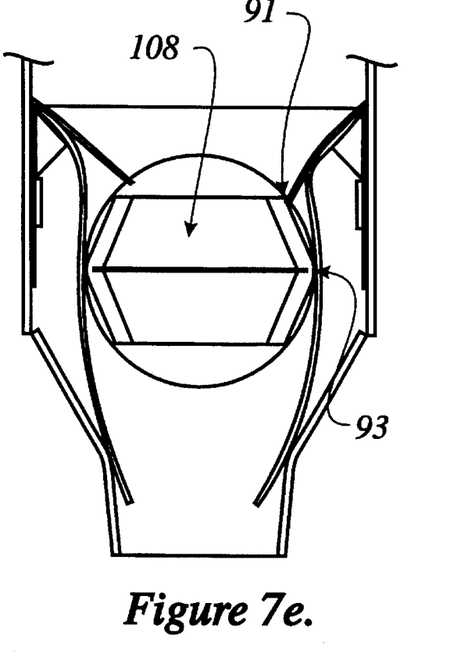

Scraper 124 rides along, and thereby scrapes, face 99, vertex 93 and face 97 as scoop 42 continues to rotate to the position shown in FIG. 7d. At the point shown vertex 91 has pushed skin 112 to its maximum deflection, assuming no material protrudes from cavity 108. Vertex 95 remains in contact with skin 112 until vertex 93 rotates far enough to push skirt 112 away from vertex 95. As shown in FIG. 7e vertex 95 has begun to move away from skirt 112, whose locus of contact has also shifted to knee 62 of sidewall 52. Cavity 108 is fully open to discharge opening 70. Vertex 94 has pushed skirt 111 to its maximum normal deflection toward wall 12. Cavity 106 is fully open to receive material from receptacle 4. Vertex 96 is about to contact scraper 117.

Figure 7F:
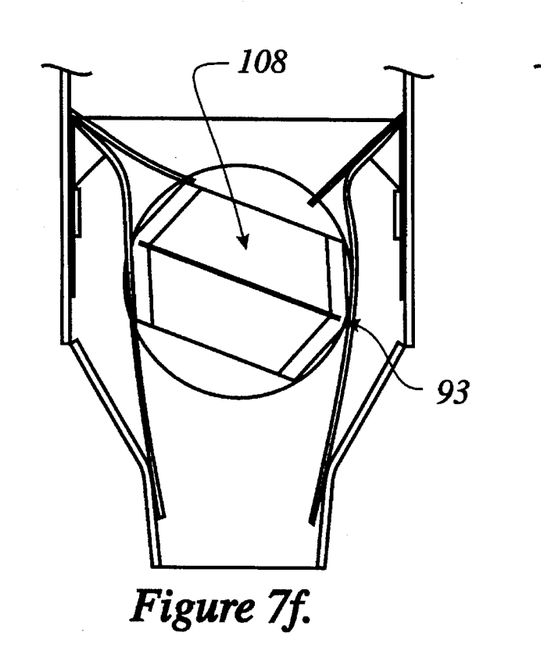

In FIG. 7f face 97 lies substantially along skirt 112. Vertex 91 has just released scraper 118, which has snapped back to a less deflected position. Vertex 96 has deflected scraper 117 to its maximum upward position. Face 98 of stringer 82 lies substantially along skirt 111.

Figure 7G:
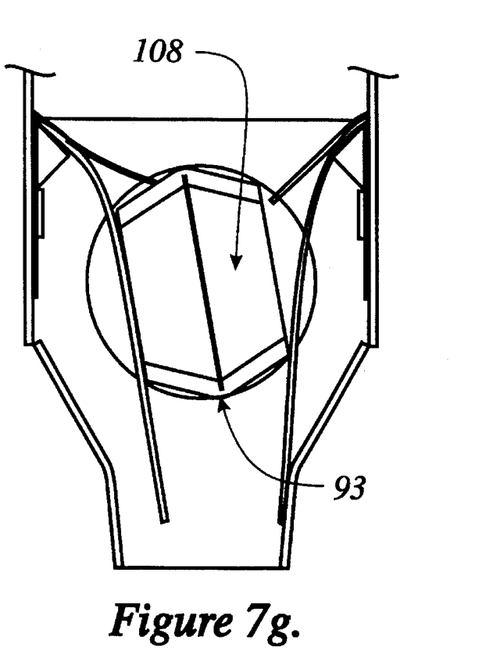

In FIG. 7g scraper 117 has continued to follow face 100, vertex 94, and face 98, which continues to deflect scraper 117 upward. Skirt 111 reaches its maximum separation from sidewall 54, and is momentarily in contact with both stringer 80 and stringer 82, closing off cavity 108. Vertex 91 continues to slide along skin 112, which, as before, remains in contact therewith due to the aforementioned spring pre-loading of skirt 112. Further turning returns scoop 42 to a position similar to, but 180 degrees from, that shown in FIG. 7a.

Continued rotation will substantially repeat the steps described above, as will rotation in the opposite direction. In the preferred embodiment shown in FIG. 7, the cavities 106 and 108 deliver roughly equal dollops of sticky material with each turn. As noted above the geometry of the scoop may be easily altered to adjust the volume of the average dollop, either by replacement with an interchangeable scoop, or by altering the partition, or by adding a second partition in a vacant pair of slots. The preferred embodiment of the present invention is intended to prevent or reduce crashing of gelatinous candies, or other foods, during operation. Candies, or other foods that tend to crumble, may not necessarily sit entirely within cavity 106 or 108, but may protrude therefrom as scoop 42 rotates. Were skins 111 and 112 rigid, fixed sidewalls, rotation of scoop 42 would tend to crush protruding candies. However skirts 111 and 112 are able to deflect outward toward walls 10 and 12 respectively, and so to accommodate protruding material to some extent.

It should also be noted that the constant flexing of skirts 111 and 112, the scraping of the scoop 42 by scrapers 117, and 118, and the snapping action as scrapers 117 and 118 are released from flexion, all help to prevent or reduce the build-up of sticky materials and help to agitate the sticky material feedstock in the receptacle 4. Although the geometry of flappers 44 and 46 and the beams 56 and 58 are variable, it is the relationship between them, the thickness of the flapper materials and the type of materials chosen for the flappers, whether plastic or metallic, that will produce a satisfactory combination of lateral displacement, springiness, snapping, and scrapping. Many potential combinations may achieve the desired result. In the preferred embodiment, the chosen plastic material for both the skirts and the scrapers may be any of A.B.S., polycarbonate, or copolyester and the included angle between faces 66 and 68 of beam 56 or 58 is 45 degrees. The length of skirts 111 and 112 is 4 and ¾ inches. The length of scrappers 117 and 118 is 1 and 4/10 inches. The diameter of aperture 30 is 3 inches. The width of carrier 40 is 4 inches.

It should also be noted that skirts 111 and 112 are termed flexible walls, as opposed to scrapers 117 and 118. Scrapers 117 and 118 are flexible, and this flexibility that allows them to follow, and thereby scrape, the stringers of scoop 42 during rotation. It is also their ability to act like springs that causes them to snap away when released. A significant difference is in the nature of the functions of the skirts and scrapers. The scoop, or material protruding from the scoop always rides, or slides, in tangential contact with the skirts. The scrapers contact the scoop at their ends, in a manner which is not usually tangential. The primary purpose of the scrapers is to strip sticky materials from the scoop. The primary purpose of the skirts is to define the outer wall of (within the range of motion) an infinitely variable geometry passageway, in this case, passageway 47. The preferred embodiment employs a continuously flexible wall. A more complex design employing a rigid wall of one or more sections of chosen curvature mounted to a hinge and biased with a spring could also be employed to give the desired flexible deflection or displacement. A flexible sheet of plastic is a comparatively simple form of a displaceable wall.

As noted above, lower portions 24 and 26 of walls 10 and 12 respectively, the bottom region of front wall 14, and frame 22 form rectangular conduit 29 by which material may exit receptacle 4. In some cases one may wish for receptacle 4 to have only one single opening such that dispenser module 6 must be removed, and hopefully cleaned, in order to refill receptacle 4, or to discourage contamination of the material in receptacle 4. The passage so formed might be considered to have an inlet adjacent to the top of frame 22 and an outlet adjacent the bottom of frame 22, front wall 14, and lower portions 24 and 26. The conduit itself may be rectangular or square, round, ovoid or ellipsoid. Provided the channel has constant section such that a carrier may slide into it, the carrier may have an outer periphery to mate with the conduit, and its own internal geometry suitable for working with scoop 42. It is not strictly necessary to have a carrier since the flexible walls, such as flappers 44 and 46, may, with appropriate modifications, be mounted directly to the conduit. For example, in the case of a conduit of curved cross section having at least one minor sector subtended by one or more flexible walls, an appropriate modification might be a tapered solid transition vane to block off the subtended minor sector. In all cases, whether the scoop 42 is mounted in a carrier 40 or directly to opposite sides of the conduit walls, scoop 42 is in some sense mounted across, and substantially obstructing the passage such that material passing down the passage must pass by way of scoop 42. In this way scoop 42 controls the egress of material from receptacle 4, and if scoop 42 stops turning, no more material will be dispensed. In the preferred embodiment scoop 42 is mounted to two rigid, planar, parallel spaced apart walls. It would be possible to form the ends of scoop 42, analogous to front plate 76 and back plate 84, in the form of a body of revolution to fit within another shape of passageway, and to suspend the flexible walls like a chord subtending an arc of a curved section, with a partition or other solid wall to block passage via the minor sector defined between such a subtending chord and the periphery of the passage. Similarly, where a carrier is used, it may itself have an outer periphery to suit a nonrectangular section while maintaining the predominantly rectangular internal passageway geometry of the preferred embodiment.

The passageway formed by the two fixed walls and two flexible walls of the preferred embodiment is generally rectangular, except in those cases where a charge of material in one or other of the cavities of the scoop protrudes beyond the lip of the scoop. It is convenient to dispose the flexible walls perpendicular to the fixed walls, particularly since the side edges of well made flexible walls may act to scrape the fixed walls. It is not strictly necessary that the flexible walls be parallel. It would be possible to make, for example, a tapered conical scoop suitable for use with non-parallel walls. Those skilled in the art will recognise that other similar variations of the present invention can be practised.

Figure 2A:
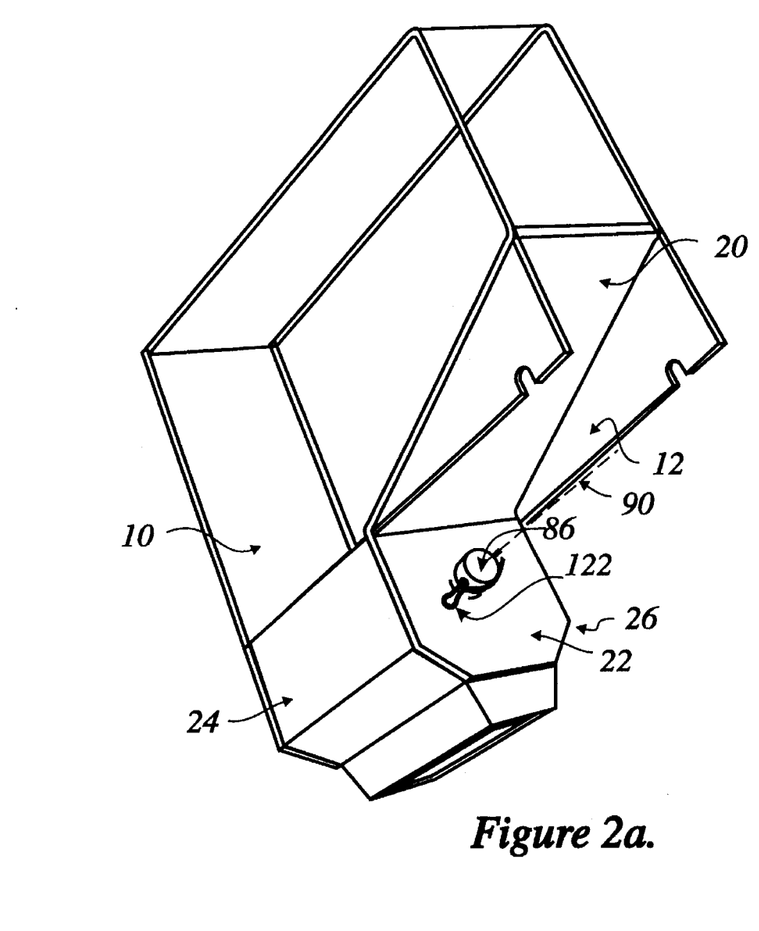
FIG. 2a shows the preferred embodiment as assembled.
Figure 2B:
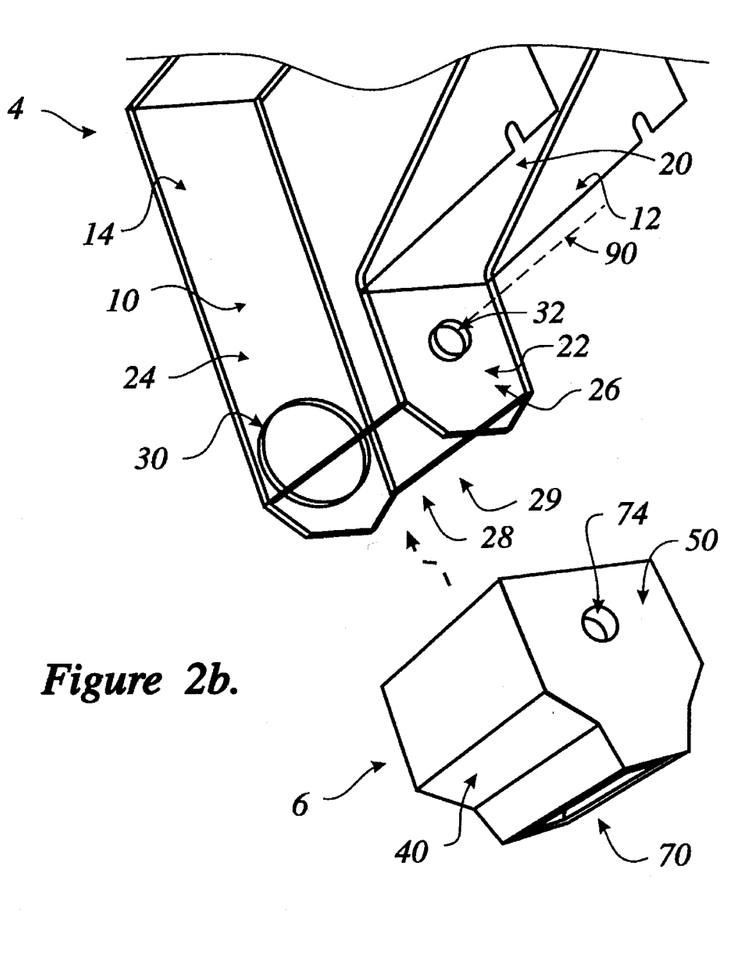
FIG. 2b shows a receptacle of the preferred embodiment awaiting installation of a modular dispenser assembly.
Figure 6A:
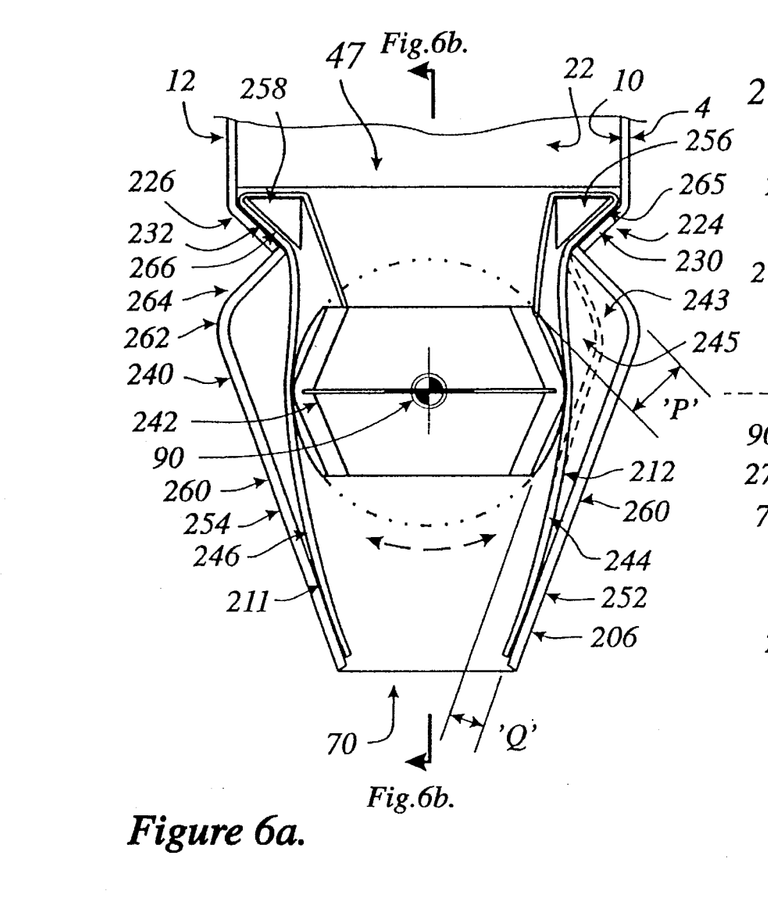
FIG 6 is a sectional view of an alternate embodiment of the dispenser of FIG. 1.
Figure 6B:
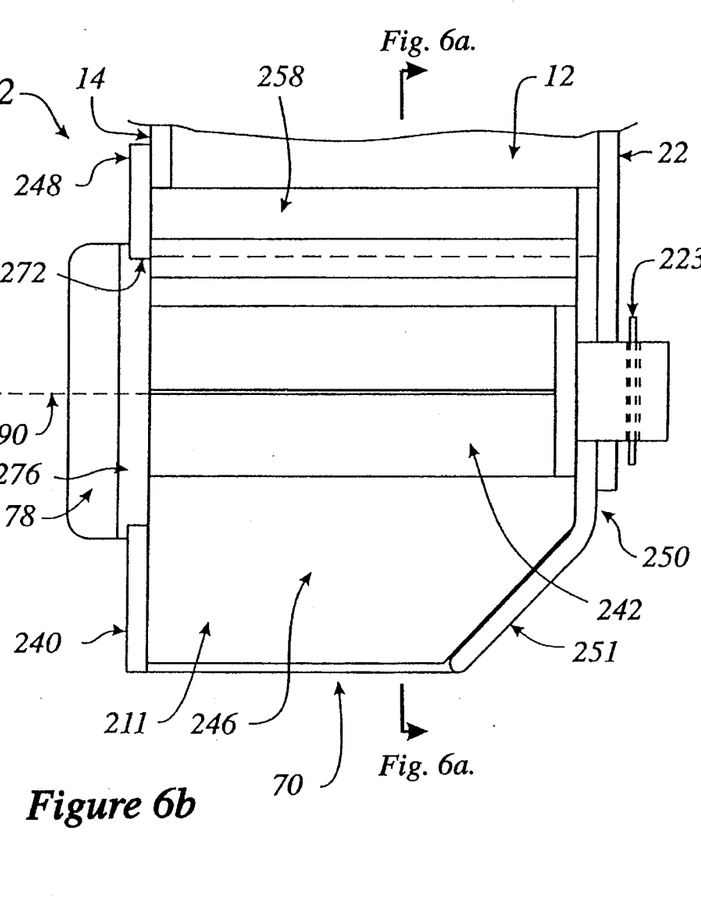

An alternate embodiment is shown in FIG. 6, in which a modular sticky food dispenser 2 comprises a receptacle 4 and a modular dispensing assembly 206. Receptacle 2 is formed of two folded sheets, the first being formed in a three sided wrap-around into first wall 10, front wall 14, and second wall 12. A second sheet is formed into top wall 16, rear wall 18, bulkhead 20, and frame 22. Lower portions 24 and 26 in the preferred embodiment of FIGS. 1 and 2 are replaced by two inwardly bent tabs of walls 10 and 12 which form slides 224 and 226, adapted for sliding engagement of a carrier 240. Carrier 240 is provided with prismatic beams 256 and 258 each having a bevelled inwardly sloping outer face 265 or 266, to which two flappers, 244 and 246, are bonded. The slopes of outer faces 265 and 266 are chosen to correspond with those of slides 224 and 226. The back sides of flappers 244 and 246 opposite outer faces 265 and 266 form runners 230 and 232. A scoop 242 is again locked in place through frame 22 with circlip or cotter pin 223. (The clearance between cotter pin 223 and frame 22 is exaggerated for clarity). A front frame 248 acts as a stop limiting the sliding engagement of runners 230 and 232 with slides 224 and 226 respectively. A front plate 276 of scoop 242 is adapted for slidable insertion, and subsequent rotation, within an aperture 272 located in frame 248. Installation of a circlip, or cotter pin 223 captures frame 22 between rear frame 250 of carrier 240 and circlip or cotter pin 223. Once again, passage 47 is defined by a combination of flexible walls, flappers 244, 246, and front and rear frames 248, 250, and is obstructed by scoop 242. The entire dispenser assembly can be removed by disengaging circlip or cotter pin 223. Scoop 242 does not have to be removed first.

Referring to section 'A—A' of FIG. 6, and also to FIGS. 3b and 3c, flappers 244 and 246 are an alternative configuration to flappers 44 and 46 shown in FIGS. 3a and 7a through 7g. Again one finds a first, major depending wing, or skirt, 211 or 212 extending well down toward discharge opening 70, with the exception that this skirt commences from the outer side of beam 256 or 258, rather than the inside of beam 56 or 58. There is a second, minor depending member, a scraper 217 or 218, disposed to follow and scrape the exterior surfaces of scoop 242 as it is rotated. The first and second depending members, skirts 211 and 212 and scrapers 217 and 218 are each adjacent an intermediate cold formed bent section 215 or 216 suited to mate with the profile of beam 256 or 258. As before many variations of beam and bend profile are possible. Note that bonding line 119 has been eliminated.

One may note, especially as shown in FIGS. 3b and 3c, the ease of manufacture of flappers 244 and 246, which may be cut and bent from a single blank 210. Optional lateral strips 245 may be left, such that the folding of scrapers 217 and 218 creates a rectangular opening 225 through which the materials to be dispensed may flow.

One may also note that whereas the peripheral clearance space between scoop 42, walls 10 and 12, and chute sidewalls 52 and 54 is roughly similar above and below the horizontal plane of centreline 90, in the alternative embodiment of FIG. 6 this is no longer true. Chute sidewalls 252 and 254 comprise a short, outwardly sloped thigh 264, a high, outboard knee 262, and a long, inward tapering foreleg 260. The horizontal plane in which centreline 90 lies is relatively far into the tapered throat formed by opposed sidewalls 252 and 254 such that the clearance dimension shown as 'Q', at the narrowest point of the throat relative to the scoop, is significantly smaller then the upper clearance dimension shown as 'P'. In the embodiment of FIG. 6, 'Q' is of the order of one half of 'P'.

As a result a kind of alcove is formed generally shown as 243 in the regions adjacent thigh 264, and the upper region of foreleg 260 opposite the periphery swept out by scoop 42. Unlike the embodiment shown in FIG. 3a and 7a through 7g, when a small candy bar, or turtle shaped chocolate, for example, protrudes from cavity 106 or 108 it will tend not to be dragged past the location of dimension 'P'. Rather skirt 211 or 212 will deflect into alcove 243 to form a bulge, or holding chamber, or pocket 245. As scoop 242 continues to turn the candy will tend either to be urged into the scoop, or to remain in the pocket until the next cavity presents itself in the next portion of the cycle of rotation. When the next cavity, be it 106 or 108, presents itself the skirt, 211 or 212, acts like a spring to urge, or flip, the candy into the cavity. The net effect is that the sealing function of skiffs 211 and 212 is generally better than that of skirts 111 and 112.

As described chute sidewalls 252 and 254 act as rigid backing members for skiffs 211 and 212, providing an outer limit to their deflection. Chute sidewalls 252 and 254 need not be continuous walls to achieve this effect or to create alcove 243 noted above. For example a grating, screen, or series of parallel bars, whether including a knee 262 or not, could easily be designed to perform the same function as thigh 264 and foreleg 260 as concerns restraining the deflection of skirts 211 and 212. All of these would be effective in constituting a rigid backing member.

Lowering the axis of rotation, centreline 90, also reduces the wear in flappers 242 and 246 due to the stress concentration at the junction with beams 256 and 258, improving the reliability of the unit.

Finally the alternative embodiment of FIG. 6 shows a dog-leg in rear frame 250, with a shank 251. This optional feature permits discharge opening 70 to correspond to the opening in standard sized paper bags such as are frequently used for coffee beans or candies.

Figure 8:
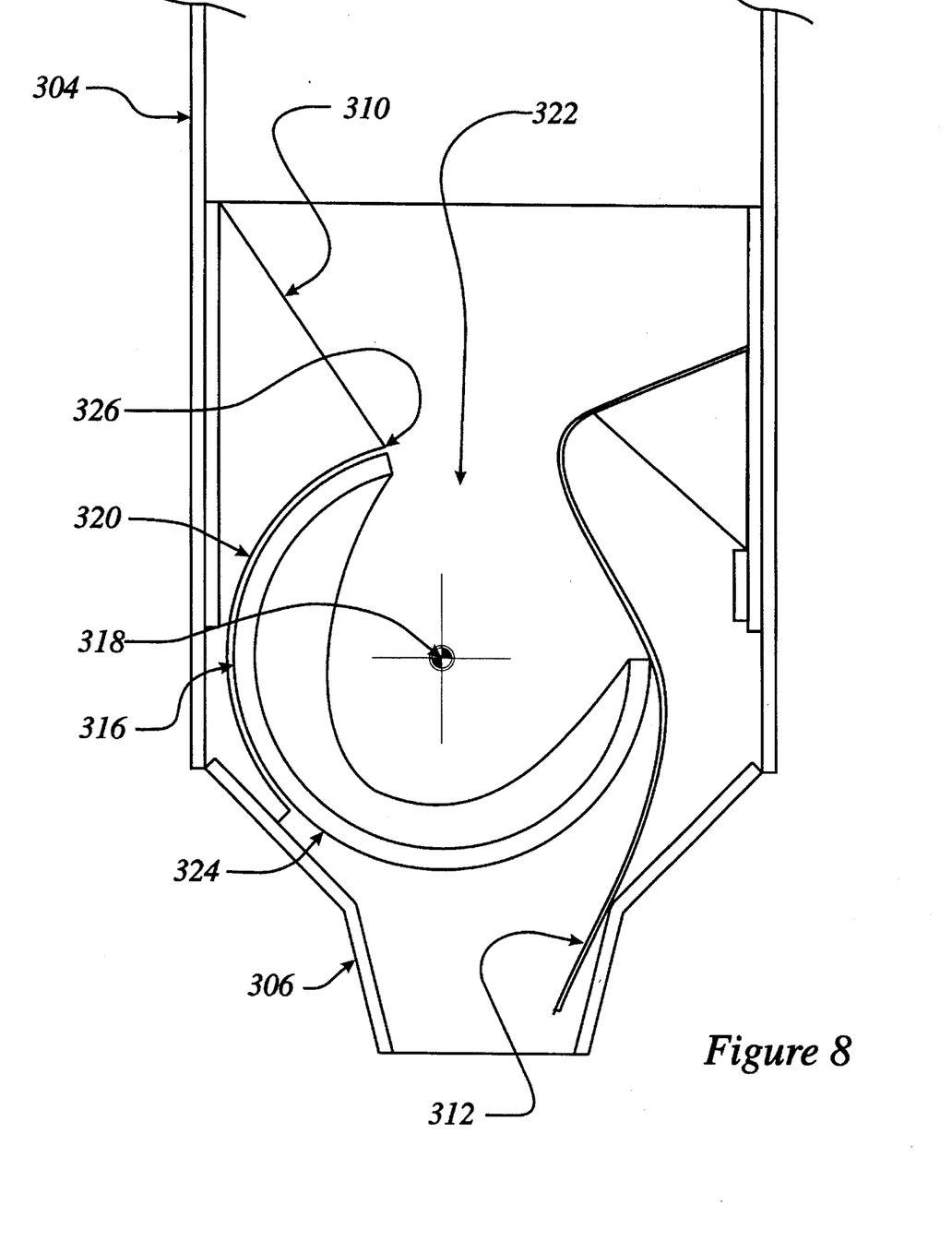
FIG. 8 illustrates an alternative embodiment of the dispenser of FIG. 1.

Embodiments of the invention described herein have been constructed, with two flexible walls, but no scraper walls. It may be possible to construct an embodiment of the present invention with only one flexible wall as shown in the cross section of FIG. 8. A receptacle 304 is shown, feeding a dispenser assembly 306. A front frame and a rear frame (not indicated) similar to front frame 48 and rear frame 50 might form the front and rear of the assembly shown in FIG. 8. The other walls of an analogous variable geometry passageway are a rigid intake wall 310 and a flexible wall, or flapper 312, which may incorporate a scraper (not shown) analogous to scrapers 117 and 118. A scoop 316 is shown mounted for rotation about an axis of rotation 318. A closure wall is shown as 320. Scoop 316 has a cavity 322, and a back shell 324. The right handed embodiment shown would be suitable for continuous clockwise operation but reverse motion would have the potential to crush to shear gummy candies on a vertex 326 of intake 310, or to cause the mechanism to jam. A left handed embodiment would be similarly suitable for counter-clockwise operation. Either embodiment would be satisfactory for rocking reciprocating motion over a limited arc. Many mechanical linkages are known for achieving rocking motion. For the embodiment shown to work satisfactorily in continuous rotation the arc subtended by closure wall 320 is preferably at least as great as the arc subtended by the opening of cavity 322.

In each case the carrier and scoop assemblies may be easily removed for cleaning or replenishment of the receptacle. For food dispensing all parts are made from non-toxic materials.

While particular and preferred embodiments of the present invention are described, it is contemplated that various changes in materials and arrangement of the various parts may be made by those skilled in the art within the spirit and scope of the present invention.

I claim:

1. A dispenser for dispensing material from a source, said dispenser comprising:

a passageway having an inlet to receive material from said source and an outlet;

a scoop for controlling the dispensing of said material, said scoop mounted across said passageway intermediate said inlet and said outlet, said scoop having at least one cavity for receiving a charge of material, said scoop movable from a first position for receiving that charge of material to a second position for discharging that charge; said passageway comprising at least two spaced apart opposed flexible walls biased toward and disposed to co-operate with said scoop, each of said walls being displaceable by both of, and in continuous contact with at least one of, (a) said scoop, and (b) a portion of said charge protruding from said scoop.

2. The dispenser of claim 1 wherein:

said scoop is pivotally mounted across said passageway;

said scoop includes actuating means for moving said scoop from said first position to said second position; and said scoop is rotatable in both clockwise and counter-clockwise directions.

3. A dispenser suitable for co-operation with a source of material to be dispensed, said source being a supply of material contained within a receptacle, said receptacle having an outlet conduit, said dispenser comprising:

a dispenser carrier for slidable location within said conduit, said carrier comprising a passageway, said passageway having an inlet for receiving material from said source, and said passageway having a periphery;

a scoop for controlling the dispensing of said material, said scoop movable from a first position for receiving a charge of said material to a second position for discharging said charge;

means for mounting said scoop across, and in substantial obstruction of, said passageway; and said carrier comprising at least one flexible wall biased toward and disposed to co-operate with said scoop, said flexible wall defining a portion of the periphery of said passageway.

4. The dispenser of claim 3 wherein:

said carrier includes at least one substantially rigid wall forming the balance of said periphery;

said scoop is mounted to said at least one substantially rigid wall for rotation about an axis;

said carrier includes two flexible walls each defining a portion of the periphery of said passageway, and each biased toward said scoop;

said scoop is intermediate said flexible walls; and said at least one substantially rigid wall defines the balance of said periphery of said passageway.

5. The dispenser of claim 1 or 3 wherein said scoop includes at least one longitudinal face, and said dispenser includes at least one flexible scraper mounted within said passageway for scraping said face.

6. The dispenser of claim 1 or 3 wherein each of said flexible walls includes:

an inward skirt having a captured end and a distal end; and a scraper mounted to said skirt for scraping said scoop.

7. The dispenser of claim 6 wherein said scraper is mounted to said skirt adjacent said captured end.

8. The dispenser of claim 7 wherein said flexible wall includes a subordinate seal member.

9. The dispenser of claim 7 wherein said skirt is disposed for substantially tangential contact of said scoop, and said scraper is disposed for intermittent scraping contact of said scoop.

10. A dispenser for dispensing material from a source, said dispenser comprising:

a variable geometry passageway;

a rotatable scoop disposed across said passageway for receiving a charge of material from the source, and for controlling flow of material through said passageway;

said variable geometry passageway comprising at least one flexible wall biased toward and for co-operation with said scoop;

said flexible wall displaceable by a portion of said charge protruding from said scoop a to form a pocket adjacent said scoop.

11. The dispenser of claim 10 wherein:

said flexible wall is disposed to depend intermediate said scoop and a backing member, and said flexible wall is displaceable to form said pocket intermediate said scoop and said backing member.

12. The dispenser of claim 10 wherein:

said scoop comprises two cavities, each having a bottom partition;

said scoop comprises a plate intermediate said partitions, said plate admitting a transverse slideable piston;

said piston comprising two opposed ends, each of said ends abutting one of said partitions, whereby motion of one partition imparts motion via said piston to the other of said partitions.

13. The dispenser of claim 10 wherein:

said variable geometry passageway has a periphery, said periphery comprising two opposed flexible walls and two mutually opposed rigid walls;

said scoop comprises at least one cavity; and said flexible walls are biased toward said scoop to maintain substantially continual contact with one of (a) said scoop, or (b) material protruding from said scoop, during rotation thereof.

* * * * *